(12) United States Patent
Lee et al.

(10) Patent No.: US 10,747,175 B2
(45) Date of Patent: Aug. 18, 2020

(54) FINGERPRINT SENSOR INTEGRATED DISPLAY USING HOLOGRAPHIC OPTICAL ELEMENT

(71) Applicant: LG Display Co., Ltd., Seoul (KR)

(72) Inventors: Guensik Lee, Paju-si (KR); Kyoseop Choo, Paju-si (KR); Seungman Ryu, Paju-si (KR); Junghoon Lee, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 180 days.

(21) Appl. No.: 15/964,023

(22) Filed: Apr. 26, 2018

(65) Prior Publication Data
US 2018/0314206 A1    Nov. 1, 2018

(30) Foreign Application Priority Data
Apr. 28, 2017   (KR) .......................... 10-2017-0055552

(51) Int. Cl.
*G03H 1/22*   (2006.01)
*G06K 9/00*   (2006.01)
(Continued)

(52) U.S. Cl.
CPC ............ *G03H 1/2202* (2013.01); *G02B 5/32* (2013.01); *G02B 27/095* (2013.01); *G03H 1/024* (2013.01); *G03H 1/0236* (2013.01); *G03H 1/0408* (2013.01); *G03H 1/2249* (2013.01); *G06F 3/042* (2013.01); *G06F 3/0412* (2013.01); *G06K 9/00013* (2013.01); *G06K 9/00087* (2013.01);
(Continued)

(58) Field of Classification Search
None
See application file for complete search history.

(56) References Cited

U.S. PATENT DOCUMENTS 3,743,421 A * 7/1973 Maloney ............ G06K 9/00006
356/71
5,095,194 A * 3/1992 Barbanell ................ G06K 9/76
235/379
(Continued)

FOREIGN PATENT DOCUMENTS

JP    S62-074175 A    4/1987
JP    H04-265986 A   9/1992
(Continued)

OTHER PUBLICATIONS

First Japanese Office Action, Japanese Patent Application No. 2018-086022, dated Apr. 4, 2019, 9 pages.
(Continued)

*Primary Examiner* — Jennifer D. Carruth
(74) *Attorney, Agent, or Firm* — Fenwick & West LLP

(57) ABSTRACT

A fingerprint sensor integrated display using a holographic optical element and a recording and reconstruction method of the holographic optical element are disclosed. The fingerprint sensor integrated display includes a display panel on which an input image is displayed, a transparent substrate disposed on the display panel, and a light entering element configured to irradiate light from a light source onto the transparent substrate. A particular type of visual information is reconstructed through a holographic element at a location of the light entering element.

9 Claims, 10 Drawing Sheets

(51) Int. Cl.

| | |
|---|---|
| *G02B 27/09* | (2006.01) |
| *G03H 1/02* | (2006.01) |
| *G06K 9/76* | (2006.01) |
| *G02B 5/32* | (2006.01) |
| *G06F 3/042* | (2006.01) |
| *G03H 1/04* | (2006.01) |
| *G06F 3/041* | (2006.01) |
| *G03H 1/26* | (2006.01) |

(52) U.S. Cl.
CPC ....... *G06K 9/76* (2013.01); *G03H 2001/0439* (2013.01); *G03H 2001/264* (2013.01); *G06F 2203/04109* (2013.01)

(56) References Cited

U.S. PATENT DOCUMENTS

| | | | |
|---|---|---|---|
| 5,138,468 A * | 8/1992 | Barbanell | A61B 5/1172 |
| | | | 235/457 |
| 5,732,148 A * | 3/1998 | Keagy | G06K 9/00046 |
| | | | 356/71 |
| 5,926,293 A | 7/1999 | Ralli | |
| 5,974,162 A | 10/1999 | Metz et al. | |
| 5,986,746 A | 11/1999 | Metz et al. | |
| 7,154,647 B1 | 12/2006 | Takabayashi et al. | |
| 7,193,755 B2 | 3/2007 | Ito | |
| 7,710,622 B2 | 5/2010 | Takabayashi et al. | |
| 9,207,638 B2 | 12/2015 | Dubois et al. | |
| 2005/0088545 A1 | 4/2005 | Ito | |
| 2006/0072178 A1 | 4/2006 | Takabayashi et al. | |
| 2007/0196003 A1 | 8/2007 | Kim et al. | |
| 2007/0288757 A1 * | 12/2007 | Tsukagoshi | G03H 1/0011 |
| | | | 713/186 |
| 2008/0231924 A1 | 9/2008 | Yamauchi | |
| 2010/0085642 A1 | 4/2010 | Drinkwater | |
| 2012/0200901 A1 | 8/2012 | Dubois et al. | |
| 2015/0185393 A1 | 7/2015 | Bang et al. | |
| 2015/0205399 A1* | 7/2015 | Kim | H04M 1/0272 |
| | | | 345/175 |
| 2015/0310251 A1 | 10/2015 | Wyrwas et al. | |

FOREIGN PATENT DOCUMENTS

| | | |
|---|---|---|
| JP | H09-509490 A | 9/1997 |
| JP | 2000-356941 A | 12/2000 |
| JP | 2001-56633 A | 2/2001 |
| JP | 2005-130091 A | 5/2005 |
| JP | 2008-242954 A | 10/2008 |
| JP | 2013-507647 A | 3/2013 |
| KR | 10-2012-0120049 A | 11/2012 |
| KR | 10-2013-0043374 A | 4/2013 |
| KR | 10-2016-0079222 A | 7/2016 |
| WO | WO 2000075732 A1 | 12/2000 |
| WO | WO 2009006747 A1 | 1/2009 |
| WO | WO 2011/042442 A1 | 4/2011 |
| WO | WO 2016/056345 A1 | 4/2016 |

OTHER PUBLICATIONS

First Taiwanese Office Action, Taiwanese Patent Application No. 107114554, dated Apr. 18, 2019, 13 pages.
Extended European Search Report, European Patent Application No. 18169950.5, dated Aug. 29, 2018, 6 pages.
Final Office Action, Japanese Patent Application No. 2018-086022, dated Mar. 3, 2020, 8 pages.

* cited by examiner $T_{CP\_AIR} < \alpha < T_{EHOE\_LR} < \theta$ ex) $45° < \alpha < 55°$
$70° < \theta < 75°$ (A)　　　　　　　　　　(B)

(A)

(B)

FINGERPRINT SENSOR INTEGRATED DISPLAY USING HOLOGRAPHIC OPTICAL ELEMENT

CROSS-REFERENCE TO RELATED APPLICATIONS

This application claims the benefit of Republic of Korea Patent Application No. 10-2017-0055552 filed on Apr. 28, 2017, the entire contents of which is incorporated herein by reference in its entirety.

BACKGROUND

Field of Technology

The present disclosure relates to a fingerprint sensor integrated display using a holographic optical element. The present disclosure also relates to a recording and reconstruction method of a holographic optical element.

Discussion of the Related Art

An electroluminescent display is classified into an inorganic electroluminescent display and an organic electroluminescent display depending on a material of an emission layer. An active matrix organic light emitting diode (OLED) display includes a plurality of OLEDs capable of emitting light by themselves and has many advantages of fast response time, high emission efficiency, high luminance, wide viewing angle, and the like.

The OLED includes an anode, a cathode, and an organic compound layer between the anode and the cathode. The organic compound layer generally includes a hole injection layer HIL, a hole transport layer HTL, an emission layer EML, an electron transport layer ETL, and an electron injection layer EIL. When a power voltage is applied to the anode and the cathode, holes passing through the hole transport layer HTL and electrons passing through the electron transport layer ETL move to the emission layer EML and combine, thereby forming excitons. As a result, the emission layer EML generates visible light by the excitons.

A fingerprint sensor is disposed at a specific location outside the screen, like the home button. The fingerprint sensor may be disposed in a bezel area outside the screen, but may result in an increase in the bezel area. A structure of a display panel may be changed so that the fingerprint sensor is disposed on the display panel.

The fingerprint sensor may be disposed on a liquid crystal display. When the fingerprint sensor is disposed between a display panel and a backlight unit of the liquid crystal display, the fingerprint sensor is visible in a screen area. A prism sheet of the backlight unit has many air gaps because of its structure. Because reception efficiency of the fingerprint sensor is reduced due to the air gaps, the fingerprint sensor cannot be disposed below the screen area of the liquid crystal display.

SUMMARY

The present disclosure provides a display device integrated with a fingerprint sensor capable of sensing a fingerprint at a screen of the display device.

The present disclosure also provides a recording and reconstruction method of a holographic optical element for the fingerprint sensor.

An electroluminescent display according to the present disclosure includes a display panel including a plurality of pixels on which an input image is displayed, a transparent substrate disposed on the display panel, and a light entering element irradiating light from a light source onto the transparent substrate. A particular type of visual information is reconstructed through a holographic element at a location of the light entering element.

The light entering element includes a particular type of visual information not having an interference pattern.

An electroluminescent display according to the present disclosure includes a display panel on which an input image is displayed, a transparent substrate disposed on the display panel, a light entering element irradiating light from a light source onto the transparent substrate, and a virtual image reconstruction element disposed on the light entering element. The virtual image reconstruction element reconstructs a particular type of visual information with a virtual image reconstructed on a holographic element having an interference pattern.

A recording and reconstruction method of a holographic optical element for an electroluminescent display according to the present disclosure includes irradiating collimated reference light of a visible band and collimated object light of the visible band onto one surface of a holographic film to record an interference pattern of the reference light and the object light, and irradiating light from a light source onto the holographic film in a vertical direction to generate diffracted light.

A recording and reconstruction method of a holographic optical element for an electroluminescent display according to the present disclosure includes irradiating collimated reference light of a visible band onto one surface of a holographic film and irradiating collimated object light of the visible band onto another surface of the holographic film to record an interference pattern of the reference light and the object light, and reconstructing a virtual image including a particular type of visual information with diffracted light generated when light of the visible band is irradiated onto the holographic film.

BRIEF DESCRIPTION OF THE DRAWINGS

The accompanying drawings, that may be included to provide a further understanding of the disclosure and are incorporated in and constitute a part of this specification, illustrate embodiments of the disclosure and together with the description serve to explain various principles of the disclosure.

DETAILED DESCRIPTION

Figure 1:
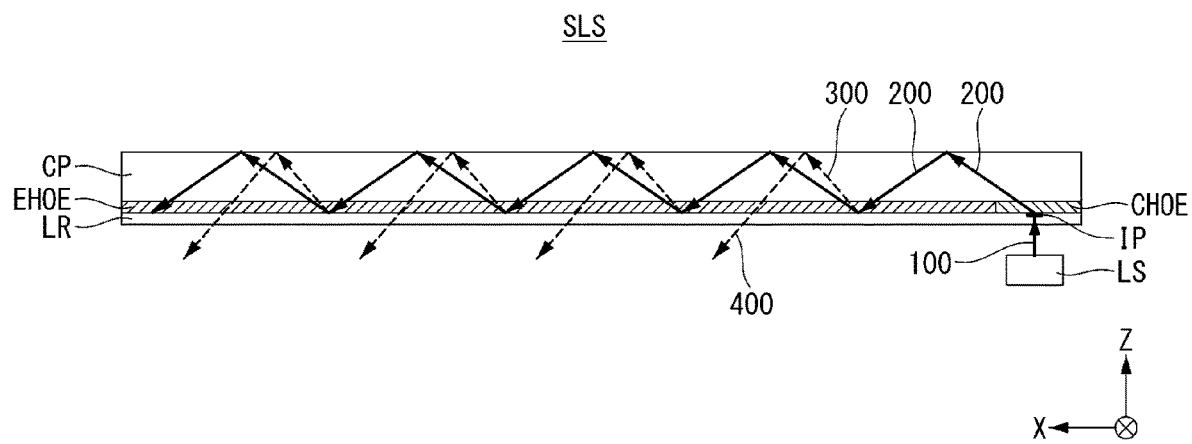
FIG. 1 is a cross-sectional view and a plan view illustrating a directional light source device, according to an embodiment of the disclosure.
Figure 1:
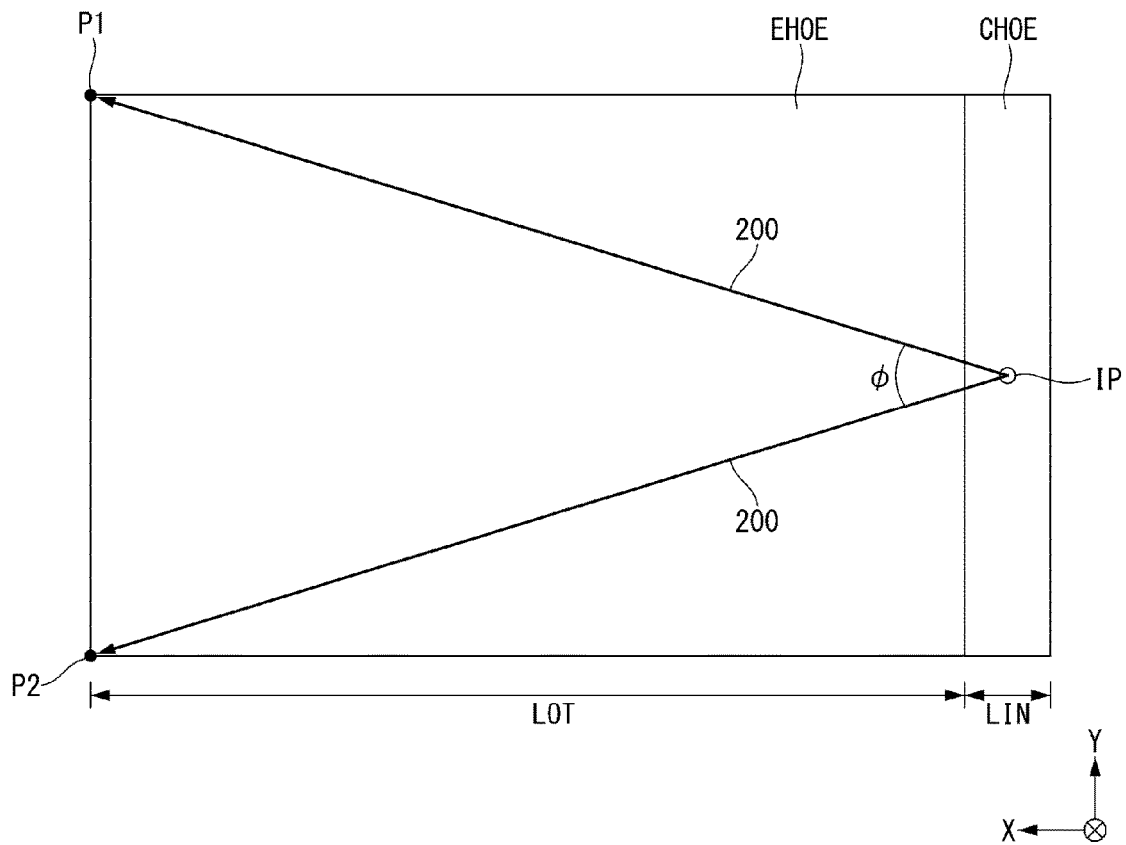

Reference will now be made in detail to embodiments of the disclosure, examples of which are illustrated in the accompanying drawings. However, the present disclosure is not limited to embodiments disclosed below, and may be implemented in various forms. These embodiments are provided so that the present disclosure will be described more completely, and will fully convey the scope of the present disclosure to those skilled in the art to which the present disclosure pertains. Particular features of the present disclosure can be defined by the scope of the claims.

Shapes, sizes, ratios, angles, number, and the like illustrated in the drawings for describing embodiments of the disclosure are merely exemplary, and the present disclosure is not limited thereto unless specified as such. Like reference numerals designate like elements throughout. In the following description, when a detailed description of certain functions or configurations related to this document that may unnecessarily cloud the gist of the disclosure have been omitted.

In the present disclosure, when the terms "include", "have", "comprised of", etc. are used, other components may be added unless "~ only" is used. A singular expression can include a plural expression as long as it does not have an apparently different meaning in context.

In the explanation of components, even if there is no separate description, it is interpreted as including margins of error or an error range.

In the description of positional relationships, when a structure is described as being positioned "on or above", "under or below", "next to" another structure, this description should be construed as including a case in which the structures directly contact each other as well as a case in which a third structure is disposed therebetween.

The terms "first", "second", etc. may be used to describe various components, but the components are not limited by such terms. The terms are used only for the purpose of distinguishing one component from other components. For example, a first component may be designated as a second component, and vice versa, without departing from the scope of the present disclosure.

The features of embodiments of the disclosure can be partially combined or entirely combined with each other, and can be technically interlocking-driven in various ways. The embodiments can be independently implemented, or can be implemented in conjunction with each other.

In the following embodiments, an electroluminescent display is described focusing on an organic electroluminescent display including an organic electroluminescent material. However, it should be noted that the technical idea of the present disclosure is not limited to the organic electroluminescent display and may be applied to an inorganic electroluminescent display including an inorganic electroluminescent material.

Figure 2:
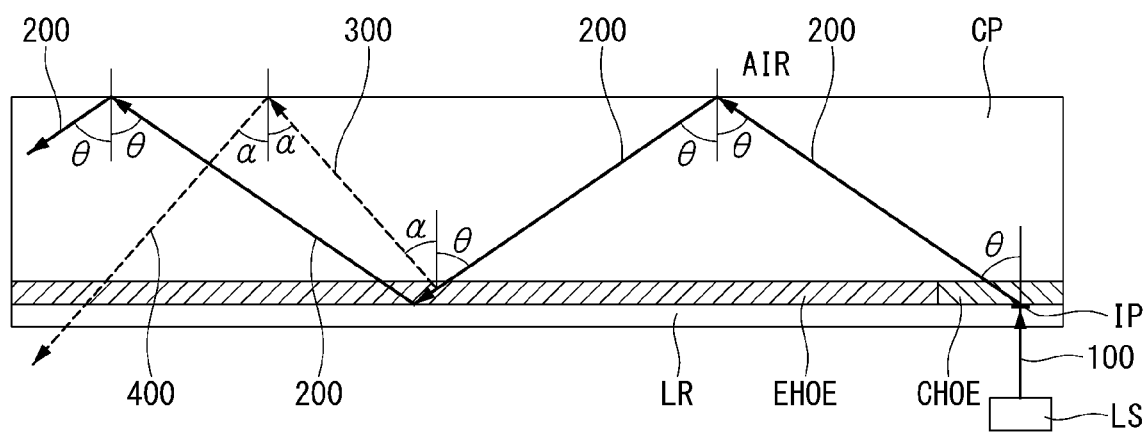
FIG. 2 is a cross-sectional view illustrating a light path in a transparent substrate shown in FIG. 1, according to one embodiment of the disclosure.
Figure 3:
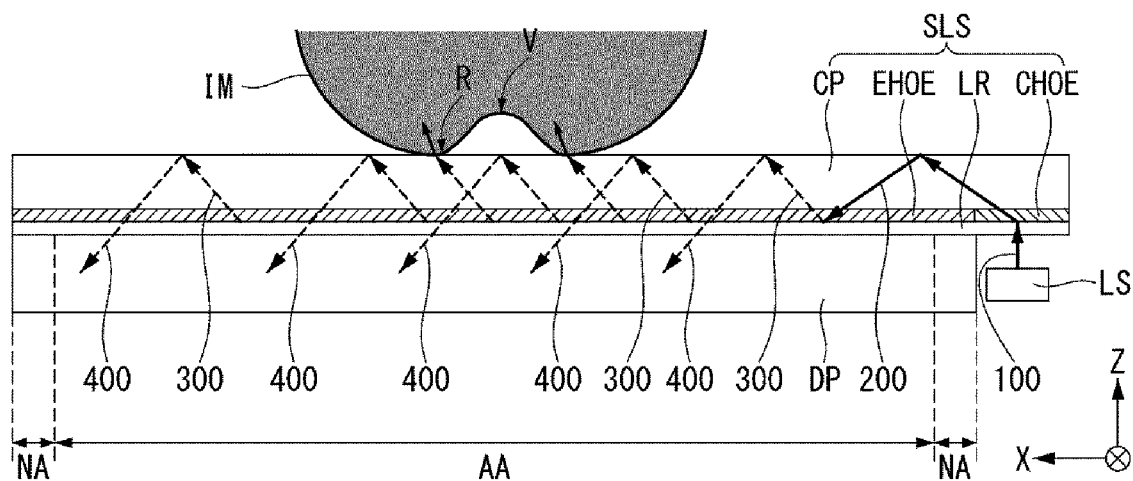
FIG. 3 is a cross-sectional view and a plan view illustrating a directional light source device disposed on a display panel, according to an embodiment of the disclosure.
Figure 3:
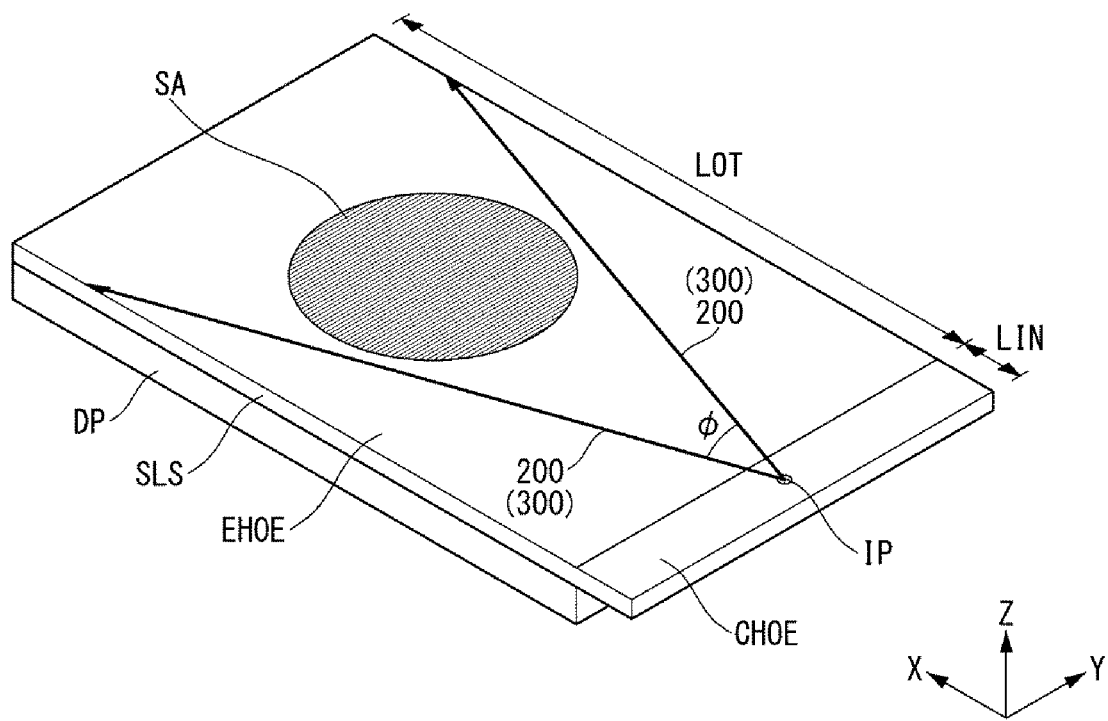

A display device according to an embodiment of the disclosure is configured such that a directional light source device SLS shown in FIGS. 1 to 3 is disposed on a display panel and an image sensor is disposed below or within the display panel, thereby sensing a fingerprint at a screen on which an input image is displayed. When a fingerprint of a user touches the directional light source device SLS, light reflected from the fingerprint is converted into an electrical signal by the image sensor and is detected as a fingerprint pattern.

A display device according to an embodiment of the disclosure includes a light entering element for irradiating light from a light source onto a transparent substrate. A specific type of visual information is reconstructed through a holographic element at a location of the light entering element included in the display device. As an example, the holographic element may be integrated with the light entering element and may include a recording surface in which an interference pattern is present in a portion of the recording surface, and the visual information is recorded on another portion of the recording surface. As another example, the holographic element may be a virtual image reconstruction element disposed on the light entering element. The virtual image reconstruction element may reconstruct the visual information with a virtual image reconstructed by diffracted light reflected from a recording surface having an interference pattern.

FIG. 1 is a cross-sectional view and a plan view illustrating a directional light source device according to an embodiment of the disclosure. FIG. 2 is a cross-sectional view illustrating a light path in a transparent substrate shown in FIG. 1. FIG. 3 is a cross-sectional view and a plan view illustrating a directional light source device disposed on a display panel.

Referring to FIG. 1, a directional light source device SLS includes a transparent substrate CP, a light source LS, a light entering element CHOE, a light exiting element EHOE, and a low refractive index layer LR.

The directional light source device SLS is an optical device for diffusing collimated light into a large area within the transparent substrate CP. In one embodiment, the light source LS provides collimated light. The light source LS irradiates laser light of an infrared band or a visible band onto the light entering element CHOE.

The light entering element CHOE is disposed between the light source LS and the transparent substrate CP and refracts light from the light source LS at an angle at which light is able to be totally reflected within the transparent substrate CP. The light exiting element EHOE is disposed between a display panel DP (see FIG. 3) and the transparent substrate CP on a screen of the display panel DP. The light exiting element EHOE refracts a portion of light travelling within the transparent substrate CP so that a portion of light travelling within the transparent substrate CP can travel toward the display panel DP through a lower surface of the transparent substrate CP. The low refractive index layer LR is disposed between the light exiting element EHOE and the display panel DP and has a refractive index less than a refractive index of the light exiting element EHOE.

The light exiting element EHOE and the light entering element CHOE are attached to the lower surface of the transparent substrate CP. The light exiting element EHOE is an optical element configured to provide outgoing light 300. A pixel array of the display panel DP, on which an input image is displayed, is disposed below the light exiting element EHOE.

The light entering element CHOE is an optical element configured to convert light from the light source LS so that light from the light source LS has collimation properties while being diffused into the transparent substrate CP. The light entering element CHOE may be disposed at an edge of the display panel DP because it is not directly associated with image to be displayed on the screen of the display panel DP. The light entering element CHOE has to face the light source LS.

The light exiting element EHOE and the light entering element CHOE may be disposed on the same plane. In one embodiment, the light exiting element EHOE and the light entering element CHOE are formed in separate areas of one film in consideration of a manufacturing process. The light exiting element EHOE and the light entering element CHOE may be a holographic optical element. The light exiting element EHOE and the light entering element CHOE may be manufactured at the same time in a hologram recording process. In a state where a master film with a pattern of the light exiting element EHOE and a master film with a pattern of the light entering element CHOE are disposed adjacent to each other in the hologram recording process, a holographic pattern for light exiting element and a holographic pattern for light entering element may be simultaneously recorded on one holographic film.

Figure 6:
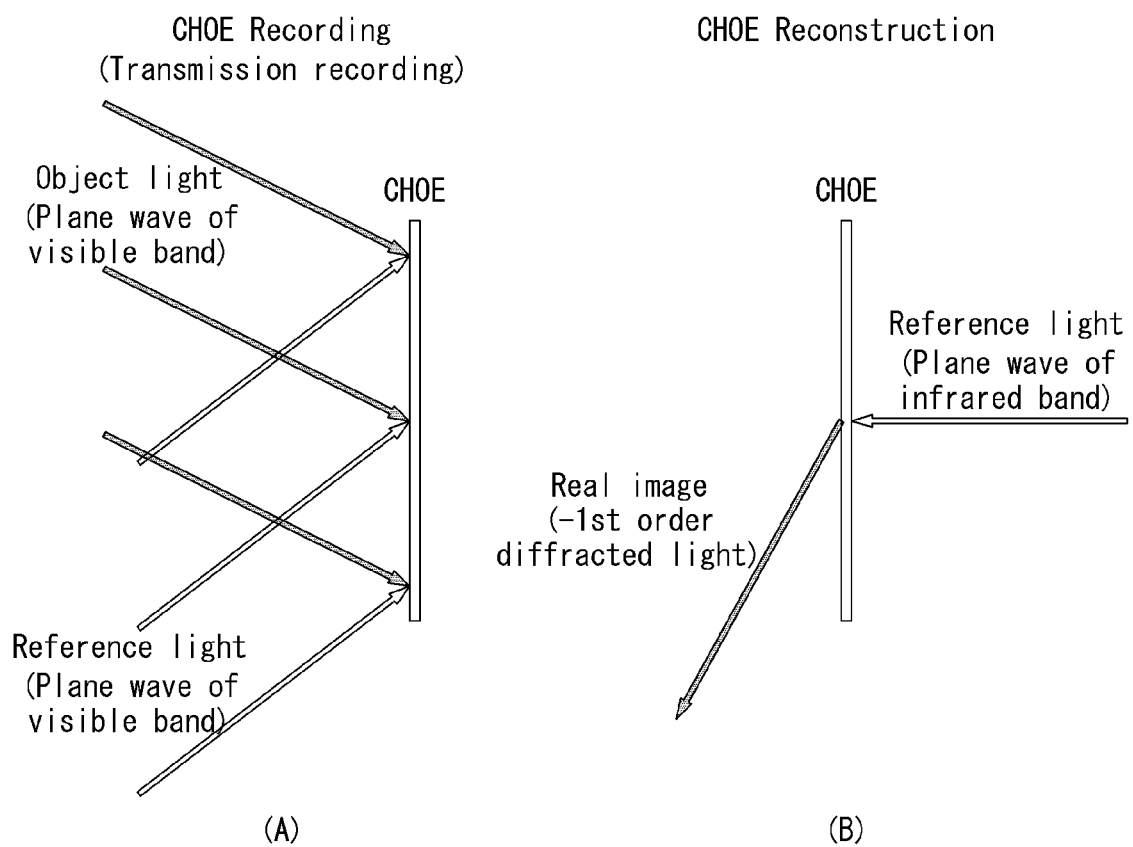
FIG. 6 illustrates a hologram recording and reconstruction method of a light entering element, according to an embodiment of the disclosure.
Figure 7:
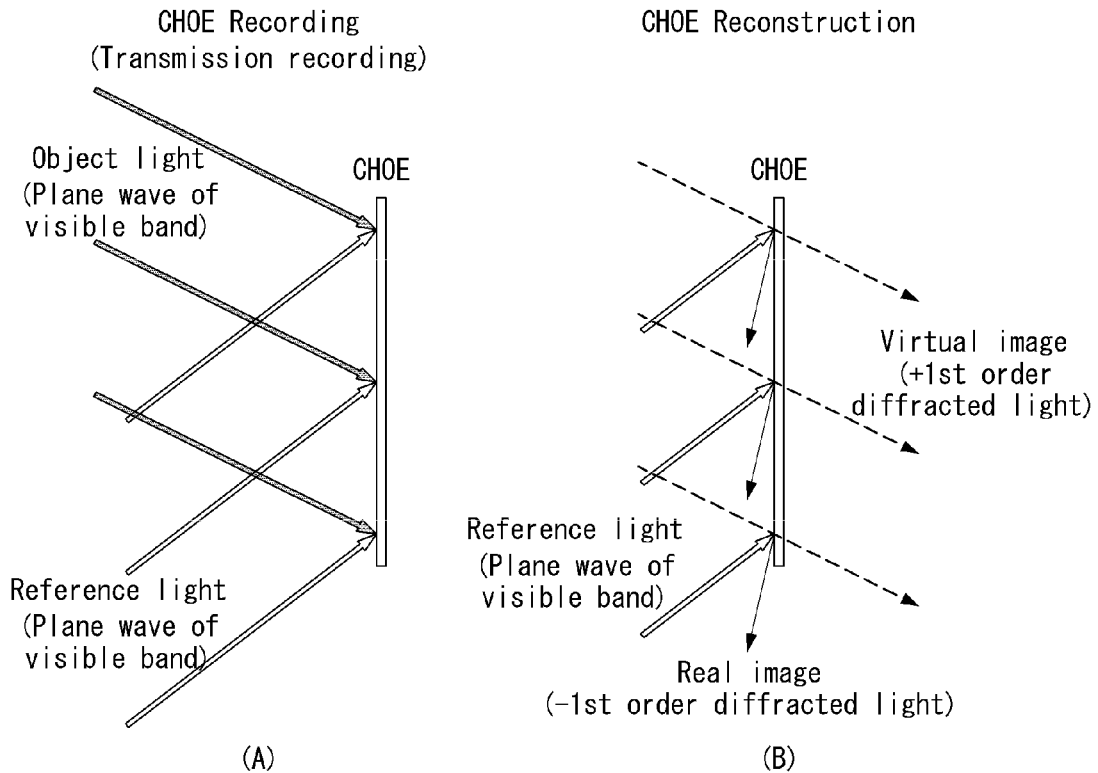
FIG. 7 illustrates a phenomenon in which a virtual image is visible to a user when external light is irradiated onto a light entering element, according to an embodiment of the disclosure.
Figure 7:
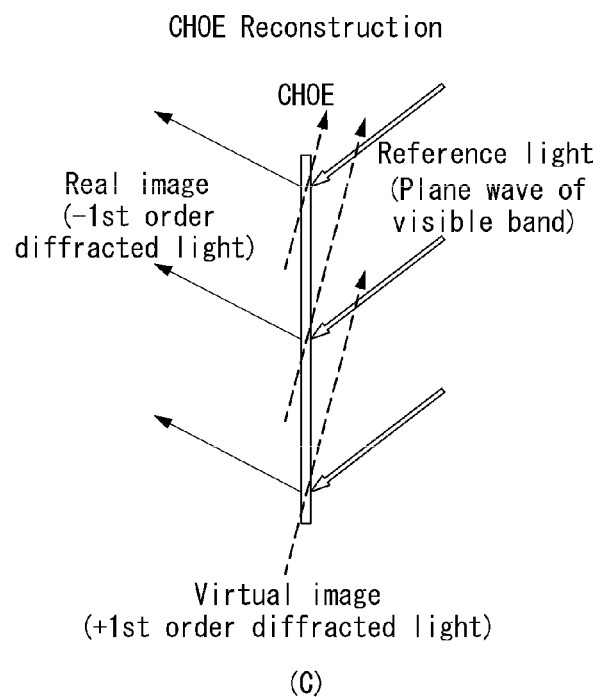

A hologram recording method may be classified into a transmission recording method and a reflection recording method. The transmission recording method irradiates reference light and object light onto one surface of a holographic film and records an interference pattern on a recording surface of the holographic film. When the reference light is irradiated onto one surface of the holographic film on which information is recorded using the transmission recording method, information of the object light is reconstructed with +1st order diffracted light and −1st order diffracted light transmitted by the holographic film as shown in FIGS. 6 and 7.

Figure 12:
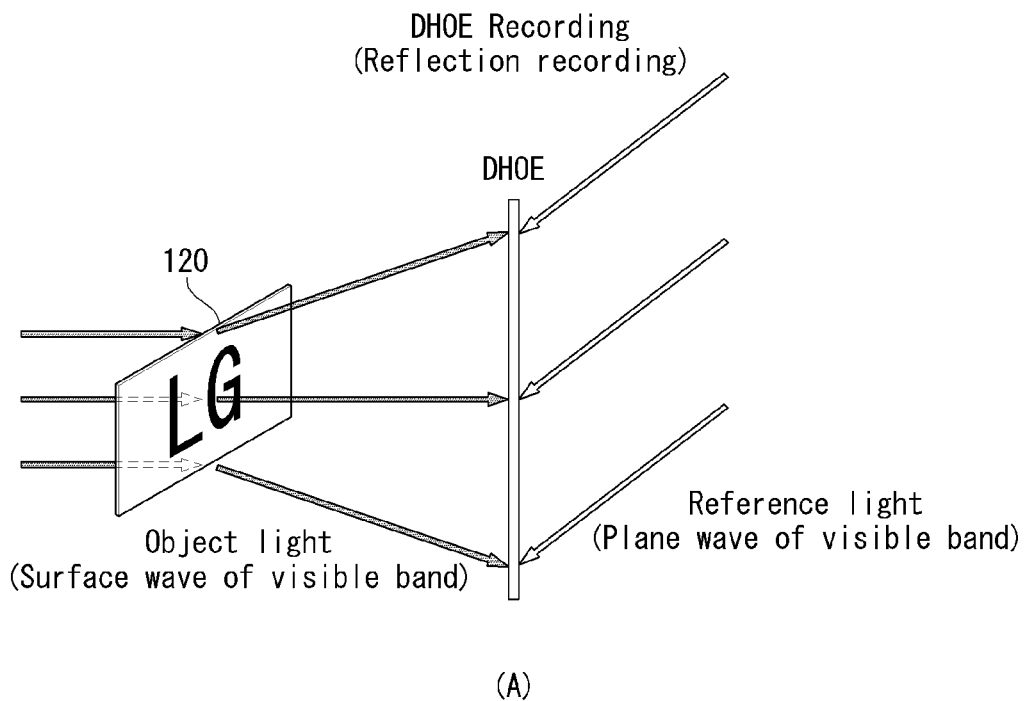
FIG. 12 illustrates a hologram recording and reconstruction method of a virtual image reconstruction element shown in FIG. 11, according to an embodiment of the disclosure.
Figure 12:
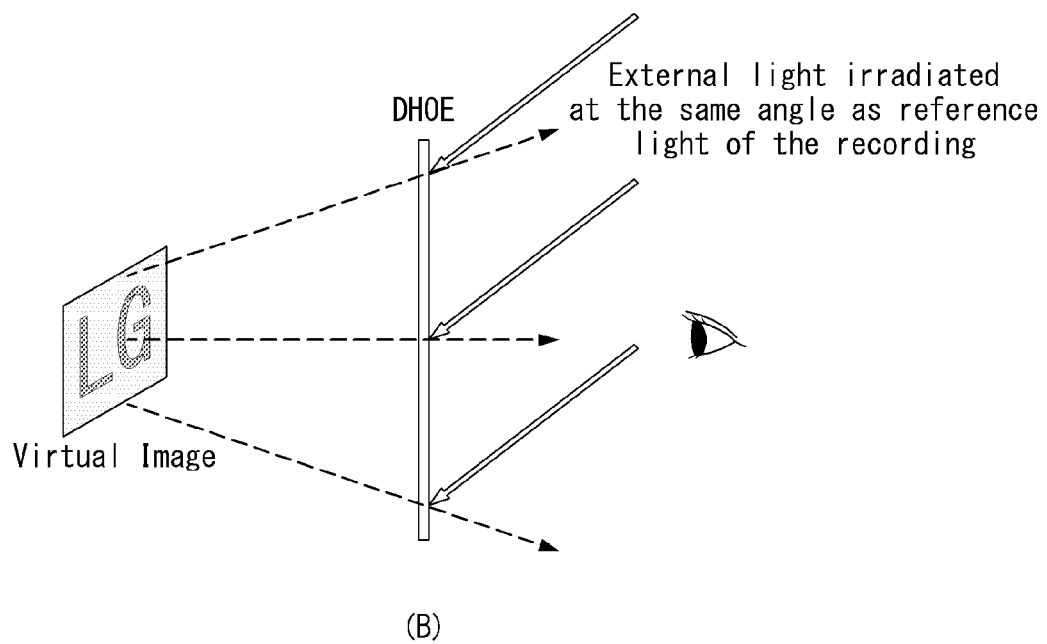

As illustrated in an example of FIG. 12, the reflection recording method irradiates reference light and object light onto a holographic film with the holographic film interposed therebetween. In the reflection recording method, the reference light is irradiated onto one surface of the holographic film, and the object light is irradiated onto the other surface of the holographic film which is opposite to the one surface of the holographic film. Hence, an interference pattern of the reference light and the object light is recorded on a recording surface of the holographic film. When the reference light is irradiated onto one surface of the holographic film on which information is recorded using the reflection recording method, information of the object light is reconstructed with +1st order diffracted light and −1st order diffracted light reflected from the holographic film as shown in FIG. 12.

The low refractive index layer LR is disposed between the elements EHOE and CHOE and the display panel DP. The low refractive index layer LR has a refractive index less than the transparent substrate CP and the light exiting element EHOE.

The transparent substrate CP may be made of a transparent substrate having a refractive index of 1.5. Each of the light exiting element EHOE and the light entering element CHOE may be made of a transparent holographic film. A refractive index of the holographic film may be equal to or slightly greater than the refractive index of the transparent substrate CP. In embodiments disclosed herein, it is assumed that the refractive index of each of the light exiting element EHOE and the light entering element CHOE is equal to the refractive index of the transparent substrate CP for convenience of explanation. In one embodiment, the refractive index of the low refractive index layer LR is similar to a refractive index of a fingerprint IM (i.e., a human skin) to be recognized. For example, the low refractive index layer LR may have the refractive index of about 1.4 which is close to a refractive index "1.39" of the human skin.

The light source LS is positioned opposite the light entering element CHOE. In one embodiment, the light source LS provides highly collimated light like a laser.

The collimated light provided by the light source LS is incident light 100, and the incident light 100 has a predetermined cross-sectional area and is provided for an incident point IP defined on the light entering element CHOE. In one embodiment, the incident light 100 enters in a normal direction to the surface of the incident point IP. However, embodiments are not limited thereto. For example, the incident light 100 may be incident at an angle inclined to a normal line of the surface of the incident point IP, if necessary or desired.

The light entering element CHOE refracts the incident light 100 to traveling light 200 with an incident angle and sends the traveling light 200 to the inside of the transparent substrate CP. In embodiments disclosed herein, the incident angle is greater than an internal total reflection critical angle of the transparent substrate CP. As a result, the traveling light 200 travels along an X-axis direction corresponding to a longitudinal direction of the transparent substrate CP while being totally reflected within the transparent substrate CP. Because light from the light source LS is totally reflected within the transparent substrate CP, the light from the light source LS is not visible from the outside even if the light is within a visible band.

The light exiting element EHOE converts a portion of the traveling light 200 into the outgoing light 300 and refracts the outgoing light 300 toward an upper surface of the transparent substrate CP. A remaining portion of the traveling light 200 is totally reflected and travels within the transparent substrate CP. The outgoing light 300 is totally reflected at the upper surface of the transparent substrate CP, but passes through the low refractive index layer LR at the lower surface of the transparent substrate CP. Namely, the outgoing light 300 serves as detection light (or referred to as "sensing light") 400 which is totally reflected at the upper surface of the transparent substrate CP and passes through the lower surface of the transparent substrate CP.

An amount of the outgoing light 300 is determined depending on light extraction efficiency of the light exiting element EHOE. For example, when the light extraction efficiency of the light exiting element EHOE is 3%, 3% of the incident light 100 is extracted as the outgoing light 300 in a first emission region where the traveling light 200 first contacts the light exiting element EHOE. Further, 97% of the incident light 100 as the traveling light 200 continues to be totally reflected and travel. Afterwards, in a second emission region, 2.91% of the incident light 100, which equals 3% of the remaining 97% of the incident light 100, is extracted as the outgoing light 300.

In such a manner, the outgoing light 300 is extracted until it reaches the far side of the transparent substrate CP opposite the light source LS. In order to provide a predetermined amount of the outgoing light 300 while the traveling light 200 travels within the transparent substrate CP, in one embodiment the light extraction efficiency of the light exiting element EHOE is designed to gradually increase exponentially.

The traveling light 200 remains collimated as the incident light 100 has been collimated, when viewed on XZ plane (or referred to as "vertical plane") including a longitudinal direction axis and a thickness direction axis. On the other hand, in one embodiment the traveling light 200 has a diffusion angle φ of FIG. 1 on XY plane (or referred to as "horizontal plane") including the longitudinal direction axis and a width direction axis. This is to set an image detection area correspondingly to the area of the transparent substrate CP. For example, in one embodiment the light exiting element EHOE is disposed corresponding to an entire area of a light output portion LOT if possible. Further, in one embodiment the diffusion angle φ is equal to or greater than an interior angle between two line segments connecting the incident point IP to two end points P1 and P2 on the other side of the transparent substrate CP opposite the light entering element CHOE.

A region where the light entering element CHOE is disposed may be defined as a light input portion LIN. The region where the light exiting element EHOE is disposed may be defined as the light output portion LOT. The light output portion LOT may be also defined as a light travel portion in which light travels.

When a cross-sectional area of collimated light provided by the light source LS is about 0.5 mm×0.5 mm, the light entering element CHOE may have a length corresponding to a width of the transparent substrate CP and a width of about 3 mm to 5 mm. The light entering element CHOE may be disposed across the width of the transparent substrate CP.

With reference to FIG. 2, a description will be made about along which path collimated light provided by the light source LS is converted into directional light used in the image detection within the transparent substrate CP.

The incident light 100 from the light source LS enters in a normal direction to the surface of the incident point IP on the light entering element CHOE. The light entering element CHOE converts the incident light 100 into the traveling light 200 which is refracted to have an incident angle θ, and sends the traveling light 200 to the inside of the transparent substrate CP.

In one embodiment, the incident angle θ of the traveling light 200 is greater than a total reflection critical angle $T_{EHOE\_LR}$ at an interface between the light exiting element EHOE and the low refractive index layer LR. For example, when the refractive indexes of the transparent substrate CP and the light exiting element EHOE are 1.5 and the refractive index of the low refractive index layer LR is 1.4, the total reflection critical angle $T_{EHOE\_LR}$ at the interface between the light exiting element EHOE and the low refractive index layer LR is about 69°. Thus, in one embodiment the incident angle θ is greater than 69°. For example, the incident angle θ may be set to be between 70° and 75°.

The traveling light 200 is totally reflected at the upper surface of the transparent substrate CP because the upper surface of the transparent substrate CP is in contact with an air layer AIR. This is because a total reflection critical angle $T_{CP\_AIR}$ at an interface between the transparent substrate CP and the air layer AIR is about 41.4°. Namely, as long as the incident angle θ is greater than the total reflection critical angle $T_{EHOE\_LR}$ at the interface between the light exiting element EHOE and the low refractive index layer LR, the incident angle θ is always greater than the total reflection critical angle $T_{CP\_AIR}$ at the interface between the transparent substrate CP and the air layer AIR.

The light exiting element EHOE converts a predetermined amount of the traveling light 200 into the outgoing light 300 having a reflection angle α and sends the outgoing light 300 back to the inside of the transparent substrate CP. The outgoing light 300 is light for recognizing a pattern of the fingerprint IM touching the upper surface of the transparent substrate CP. When there is no fingerprint on the surface of the transparent substrate CP, the outgoing light 300 has to be totally reflected at the upper surface of the transparent substrate CP and propagate to an image sensor disposed below the directional light source device SLS. After the outgoing light 300 is totally reflected at the upper surface of the transparent substrate CP, the outgoing light 300 serves as the detection light 400 and propagates under the directional light source device SLS. As shown in FIG. 2, $T_{CP\_AIR} < \alpha < T_{EHOE\_LR} < \theta$. For example, the reflection angle α may be set to be between 45° and 55°, and the incident angle θ may be set to be between 70° and 75°.

Figure 4:
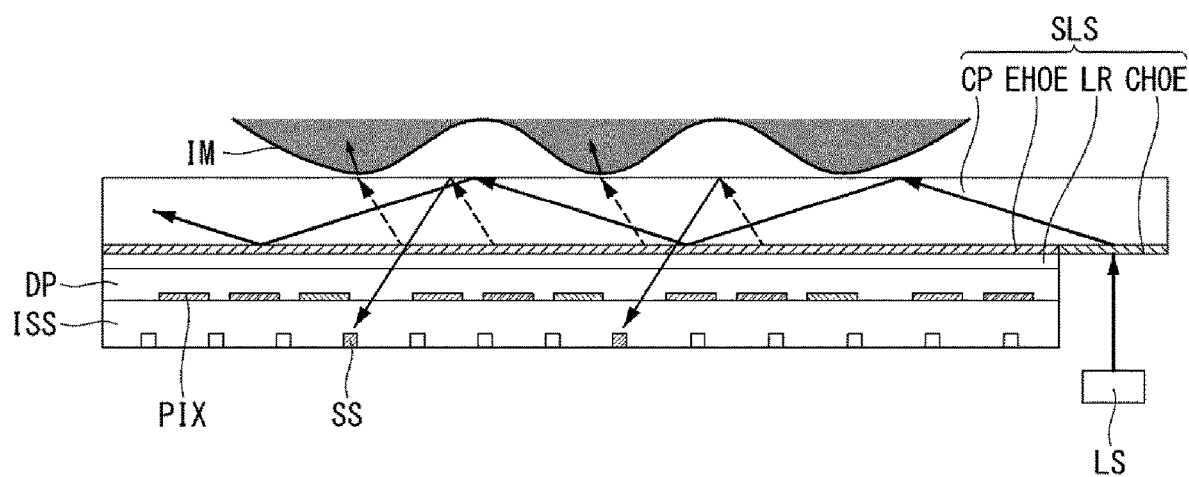
FIG. 4 is a cross-sectional view of an electroluminescent display according to an embodiment of the disclosure.

As shown in FIG. 3, the display panel DP may be disposed below the directional light source device SLS. An image sensor ISS for detecting a fingerprint pattern may be embedded in the display panel DP or may be disposed below the display panel DP as shown in FIG. 4. Pixels SS of the image sensor ISS may be embedded in the display panel DP together with pixels PIX of the display panel DP. The image sensor ISS may be attached to the display panel DP using an adhesive such as an optical clear adhesive (OCA), a pressure sensitive adhesive (PSA), etc. However, embodiments are not limited thereto. The image sensor ISS can be a fingerprint sensor.

Referring to FIGS. 3 and 4, the incident light 100 is converted into the traveling light 200 by the light entering element CHOE. The traveling light 200 is converted in such a way that it has the diffusion angle φ on the XY plane which is the horizontal plane including an X-axis of the longitudinal direction axis and a Y-axis of the width direction axis. The traveling light 200 also maintains an originally collimated state (in which the incident light 100 has been collimated) on the XZ plane which is the vertical plane including the X-axis of the longitudinal direction axis and a Z-axis of the thickness direction axis.

In one embodiment, the diffusion angle φ is equal to or greater than an interior angle between two line segments connecting the incident point IP to two end points on the other side of the transparent substrate CP opposite the light entering element CHOE. In this instance, the traveling light 200 propagates within the transparent substrate CP while being diffused in a triangular shape having the diffusion angle φ. The outgoing light 300 is also provided within the same range as the traveling light 200. As a result, a fingerprint sensing region SA may be selected within a triangle area that widens from the incident point IP with the diffusion angle φ. A circular hatched portion of FIG. 3 may be designated as the fingerprint sensing region SA. However, embodiments are not limited thereto.

When the fingerprint sensing region SA is formed in a center portion of the display panel DP or in a portion of an upper side of the display panel DP opposite the light entering element CHOE, an amount of the outgoing light 300 has a maximum value in the fingerprint sensing region SA. To this end, the light extraction efficiency of the light exiting element EHOE may be designed as a function of position so that it has a maximum value in a portion corresponding to the fingerprint sensing region SA and has a minimum value or a value close to zero in the other portions.

When the fingerprint IM touches the transparent substrate CP, light is reflected from the upper surface of the transparent substrate CP at a location of valleys V of the fingerprint IM, passes through the light exiting element EHOE and the low refractive index layer LR, and travels toward the display panel DP. Therefore, the light can reach the image sensor ISS. On the other hand, because light at ridges R of the fingerprint IM touching the transparent substrate CP propagates to the outside through the human skin, the light cannot reach the image sensor ISS. The image sensor ISS converts the received light into an electrical signal to detect a fingerprint pattern. For example, the image sensor ISS may convert the ridges R of the fingerprint IM into data of a white gray level and convert the valleys V of the fingerprint IM into data of a black gray level. On the contrary, the image sensor ISS may convert the ridges R of the fingerprint IM into data of a black gray level and convert the valleys V of the fingerprint IM into data of a white gray level.

The embodiment of the disclosure can increase efficiency of light received on the image sensor ISS by disposing the image sensor ISS below the fingerprint sensing region SA and can display an image indicating a location of the fingerprint sensing region SA on the screen so that a user can easily know the location of the fingerprint sensing region SA.

The light exiting element EHOE and the low refractive index layer LR are disposed on the display panel DP. The low refractive index layer LR may be attached to the display panel DP using an optical clear adhesive. The pixels SS of the image sensor ISS are positioned opposite the transparent substrate CP, the light exiting element EHOE, and the low refractive index layer LR of the directional light source device SLS.

The light 400 reflected from the fingerprint IM is received by the image sensor ISS. Each pixel SS of the image sensor ISS converts the light 400 reflected from the fingerprint IM into a voltage using a photodiode converting light into an electrical signal. The image sensor ISS amplifies a voltage output from each of photo sensors and converts the amplified voltage into digital data.

The screen of the display panel DP includes the pixel array displaying an input image. The pixel array includes a plurality of data lines, a plurality of gate lines intersecting the data lines, and the pixels PIX arranged in a matrix. Each pixel PIX may include a red subpixel, a green subpixel, and a blue subpixel for color implementation. Each pixel PIX may further include a white subpixel. Each subpixel may include a light emitting element such as an organic light emitting diode (OLED).

Figure 5:
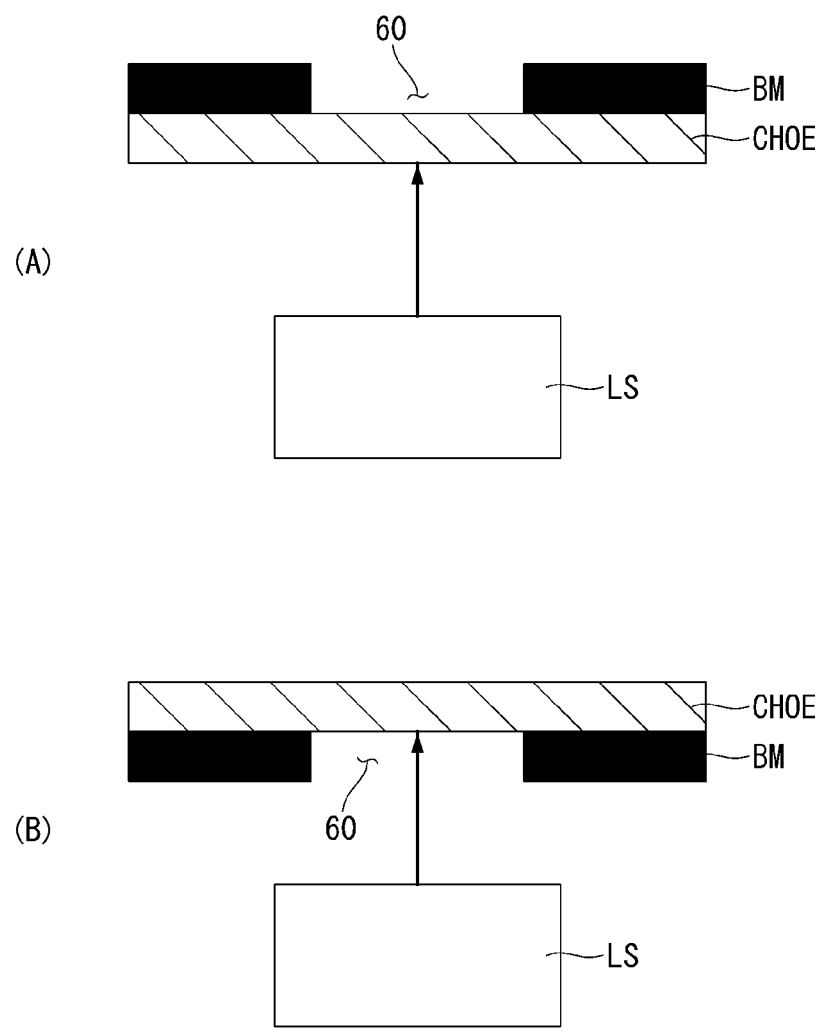
FIG. 5 illustrates a light blocking layer disposed at a directional light source device, according to an embodiment of the disclosure.

As shown in (A) and (B) of FIG. 5, a light blocking layer BM may be disposed on or below the light entering element CHOE, so that the light source LS of the directional light source device SLS is not visible to the user. The light blocking layer BM has a hole 60, in order to secure a light path between the light source LS and the light entering element CHOE and secure a light path of a virtual image to be described later. The light blocking layer BM may be implemented as a dark colored or black adhesive film. However, embodiments are not limited thereto.

Light from the light source LS is refracted by the light entering element CHOE at a total reflection angle and is incident on the transparent substrate CP. As described above, the light entering element CHOE may be implemented as a holographic optical element. When reference light and object light are irradiated onto a film of the holographic optical element, an interference pattern formed by a combination of an object wave and a reference wave is recorded on the film. When the reference wave is irradiated onto the film on which the interference pattern of the object wave and the reference wave is recorded, light can be irradiated onto the transparent substrate CP at a desired angle through the light entering element CHOE without a separate lens because the object wave is reconstructed.

When external light is irradiated onto the light entering element CHOE, an undesired virtual image may be visible through the light entering element CHOE. This is described in detail below with reference to FIGS. 6 and 7.

Referring to FIG. 6, (A) illustrates a recording method of the light entering element CHOE, and (B) illustrates a reconstruction method of the light entering element CHOE.

As shown in (A) of FIG. 6, the embodiment of the disclosure may use a transmission recording method for irradiating reference light and object light onto one surface of a holographic film for light entering element, as a hologram recording method. In the hologram recording method, an interference pattern of the reference light and the object light is recorded on the holographic film. In the hologram recording method according to the embodiment of the disclosure, the reference light and the object light use a collimated plane wave of a visible band that can be visually confirmed. In particular, the reference light and the object light are irradiated onto the holographic film using light having a green light wavelength band (for example, a wavelength of 532 nm). Because green light is easily visible to the naked eye, a light path of the reference light and the object light can be easily confirmed.

Information of the object light is recorded on the holographic film in the form of an interference pattern. When the reference light is irradiated onto the holographic film in the hologram reconstruction, the object light information is reconstructed. When the reference light is irradiated onto the interference pattern of the holographic film in the hologram reconstruction, −1st order diffracted light and +1st order diffracted light are simultaneously generated in the holographic film. Hence, the object light is reconstructed. In the hologram reconstruction for the light entering element CHOE, the reference light irradiated onto the holographic film is collimated light of an infrared or visible band that is incident on the holographic film at right angle for the holographic film from the light source LS.

Because the object light irradiated on the hologram recording surface for the light entering element CHOE is collimated light, the −1st order diffracted light and the +1st order diffracted light generated from the hologram reconstruction are collimated plane waves. In FIG. 7, a real image shown by a thin solid line is the −1st order diffracted light, and a virtual image indicated by a dotted line is the +1st order diffracted light.

As shown in (B) of FIG. 6, an incident angle of the reference light in the hologram recording is calculated as a desired emission angle of the −1st order diffracted light when reference light of an infrared band (for example, 850 nm to 940 nm) is incident on the holographic film at right angle for the holographic film in the hologram reconstruction. Light that is irradiated at right angle on the holographic film from the light source LS in the hologram reconstruction may be a plane wave of an infrared or visible band. In (B) of FIG. 6, a light path of "real image" is a light path of the −1st order diffracted light refracted by an interference pattern of the holographic film when the reference light of the infrared band is irradiated onto the holographic film at right angle in the hologram reconstruction. The −1st order diffracted light is the traveling light 200 shown in FIGS. 1 to 3 that is refracted through the light entering element CHOE and is incident on the transparent substrate CP.

As shown in (B) of FIG. 6, an incident angle of the object light in the hologram recording is calculated so that the −1st order diffracted light is emitted at a desired angle (i.e., an angle allowing the −1st order diffracted light to be totally reflected within the transparent substrate CP) due to an interference pattern of the holographic film when reference light of the infrared band is incident onto the holographic film at right angle in the hologram reconstruction.

The hologram reconstruction method irradiates collimated light from the light source LS as reference light onto the holographic film at a vertical angle. When the reference light is irradiated onto the holographic film as described above, the −1st order diffracted light and the +1st order diffracted light simultaneously propagate at different angles due to the interference pattern recorded on the holographic film. The +1st order diffracted light (i.e., light of the virtual image) generated at the same time as the −1st order diffracted light has to be invisible to the user. However, when external light is incident on the light entering element CHOE, the +1st order diffracted light propagates and may be visible to the user.

Figure 8:
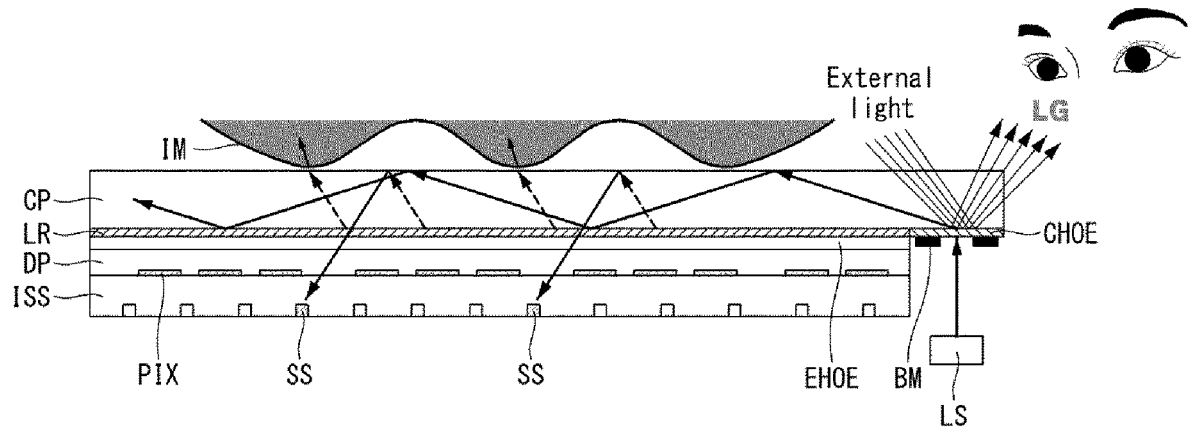
FIG. 8 illustrates a virtual image of a logo form that is visible to a user when external light is irradiated onto a light entering element, according to an embodiment of the disclosure.
Figure 11:
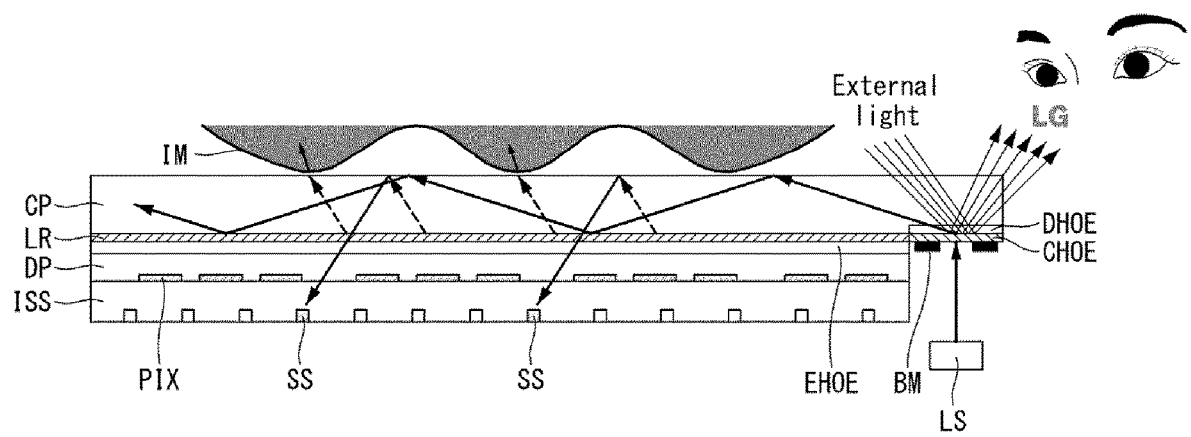
FIG. 11 illustrates a virtual image reconstruction element disposed on a light entering element, according to an embodiment of the disclosure.

(A) of FIG. 7 illustrates a light path of reference light and object light of a visible band in the hologram recording. (B) of FIG. 7 illustrates a light path of −1st order diffracted light and +1st order diffracted light that are simultaneously generated when reference light of a visible band in the hologram reconstruction is irradiated onto the holographic film at the same angle as reference light in the hologram recording. (C) of FIG. 7 illustrates an example where when reference light of a visible band in the hologram reconstruction is irradiated onto the holographic film at 180° with respect to an incident angle of reference light in the hologram recording, +1st order diffracted light propagates at an angle parallel to a light path of −1st order diffracted light and is visible to the user in the hologram recording. Thus, when external light of a visible band is irradiated onto the light entering element CHOE at an angle of the reference light shown in FIG. 7, the +1st order diffracted light is visible to the user. The +1st order diffracted light visible to the user appears as a stain of an irregular shape not including specific visual information. The embodiments of the disclosure can reconstruct specific visual information using the light entering element CHOE or a virtual image reconstruction element DHOE without the strain resulting from the external light, as shown in FIGS. 8 and 11. In embodiments disclosed herein, the specific visual information includes an image, a logo, etc. that are previously set and have a particular form. However, embodiments are not limited thereto.

Figure 9:
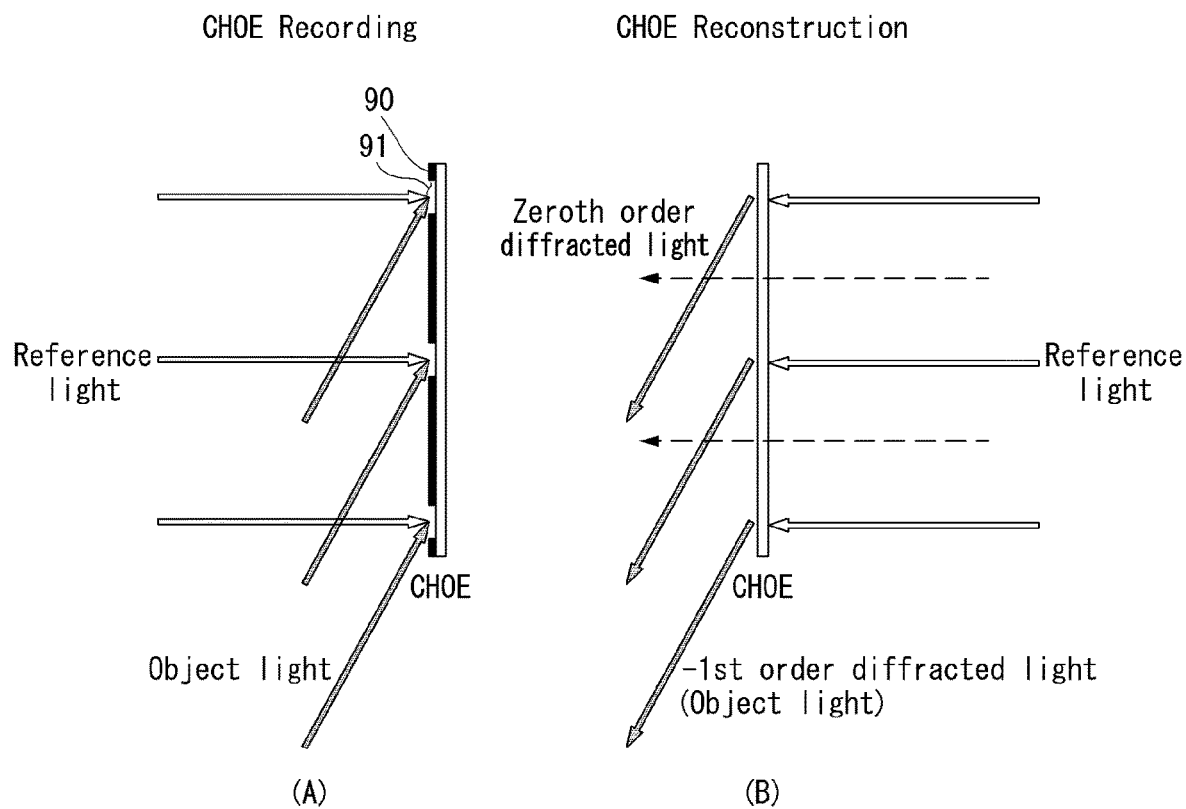
FIG. 9 illustrates a hologram recording and reconstruction method of a light entering element for displaying a virtual image including visual information that is visible to a user, according to an embodiment of the disclosure.

FIG. 8 illustrates a virtual image of a logo form that is visible to the user when external light is irradiated onto the light entering element CHOE. FIG. 9 illustrates a hologram recording and reconstruction method of the light entering element CHOE for displaying a virtual image including visual information that is visible to the user.

Referring to FIGS. 8 and 9, the embodiments of the disclosure irradiates collimated reference light of a visible band and collimated object light of the visible band onto a holographic film for the light entering element CHOE in a state where a light shielding layer pattern 90 of a particular form is formed on the holographic film. A light shielding layer may include a light shielding material, for example, a black matrix material or metal. The light shielding layer pattern 90 has openings 91 for exposing a portion of a recording surface of the holographic film to light. Thus, the openings 91 do not include the light shielding material.

In a process for recording an interference pattern of the holographic film, a light shielding layer pattern including a particular type of visual information is disposed on one surface of the holographic film. After the interference pattern is recorded on the holographic film, the light shielding layer pattern is removed from the holographic film.

As shown in (A) of FIG. 9, in the hologram recording, collimated reference light of a visible band and collimated object light of the visible band are irradiated onto the holographic film in the form of a plane wave. In this instance, the reference light and the object light do not reach the recording surface of the holographic film on which the light shielding layer is formed, and are irradiated onto the recording surface exposed by the openings 91.

Figure 10:
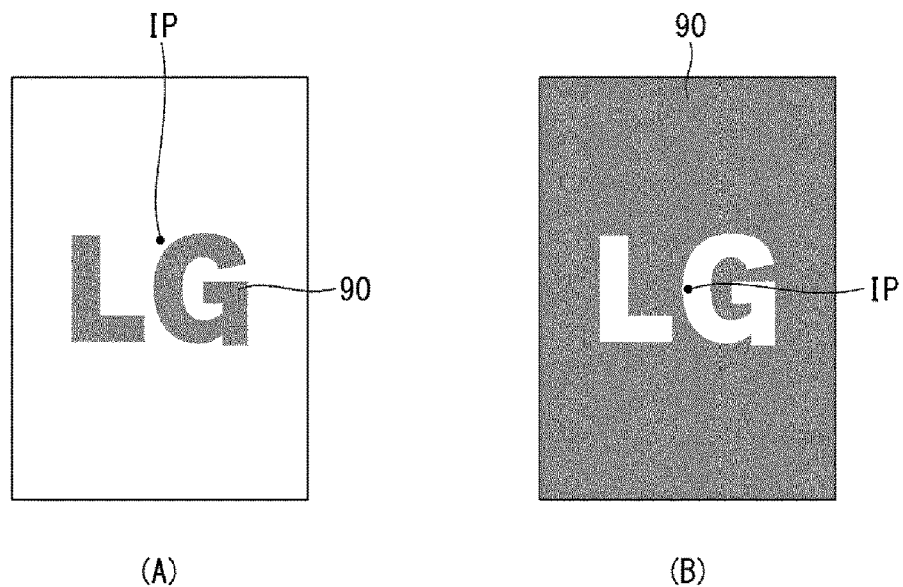
FIG. 10 illustrates an example of a light shielding layer pattern, according to an embodiment of the disclosure.

As shown in (B) of FIG. 9, in the hologram recording method, the light shielding layer pattern 90 is removed from the holographic film, on which an interference pattern of the reference light and the object light is recoded, and the opening 91 is used as the light entering element CHOE of the directional light source device SLS. As shown in FIG. 10, the light shielding layer pattern 90 is patterned as a particular form "LG" and represents visual information.

In the hologram reconstruction, when collimated light from the light source LS is irradiated onto the holographic film of the light entering element CHOE at right angle, −1st order diffracted light and +1st order diffracted light are generated in a portion of the holographic film on which the interference pattern is recorded. On the other hand, in the hologram recording, because there is no interference pattern on the recording surface covered with the light shielding layer, light from the light source LS passes through a portion of the recording surface covered with the light shielding layer as zeroth order diffracted light. In the hologram recording, because there is no interference pattern on the recording surface covered with the light shielding layer, +1st order diffracted light is not generated even if external light is irradiated onto the recording surface covered with the light shielding layer. Therefore, a virtual image resulting from the +1st order diffracted light is not visible to user. The user can view a particular type of visual information (see FIG. 10) formed by the light shielding layer pattern through the light entering element CHOE. In the hologram reconstruction, collimated light from the light source LS is irradiated at right angle onto the recording surface of the light entering element CHOE at an incident point IP of the opening to which the light shielding layer pattern is not disposed.

FIG. 11 illustrates the virtual image reconstruction element DHOE disposed on the light entering element CHOE. FIG. 12 illustrates a hologram recording and reconstruction method of the virtual image reconstruction element DHOE shown in FIG. 11.

Referring to FIGS. 11 and 12, the virtual image reconstruction element DHOE is disposed on the light entering element CHOE. The virtual image reconstruction element DHOE may be implemented as a holographic optical element. The virtual image reconstruction element DHOE reconstructs a particular type of visual information as a virtual image using the +1st order diffracted light generated when external light is incident on the light entering element CHOE at an angle shown in (C) of FIG. 7. Because an amount of external light reaching the light entering element CHOE greatly decreases due to the virtual image reconstruction element DHOE, an amount of +1st order diffracted light of the light entering element CHOE greatly decreases as shown in (C) of FIG. 7. Thus, when the external light is irradiated onto the virtual image reconstruction element DHOE, the user can view a particular type of image or logo reconstructed by the interference pattern of the virtual image reconstruction element DHOE.

As shown in (A) of FIG. 12, a reflection recording method may be applied to a hologram recording method of the virtual image reconstruction element DHOE. In the hologram recording, object light is irradiated onto one surface of the holographic film through a diffuser plate 120, on which a particular type of visual information "LG" is formed. As described above, in the hologram recording, a light path of reference light and object light can be easily confirmed by using green light as the object light and the reference light.

In the hologram recording, the object light is irradiated onto the diffuser plate 120 from a recording light source (not shown) as a collimated plane wave of a visible band, and the diffuser plate 120 diffuses light. Thus, light passing through the diffuser plate 120 is irradiated onto the holographic film as a surface wave of the visible band. When light is diffused through the diffuser plate 120, +1st order diffracted light generated in the hologram reconstruction is diffused at several angles. Therefore, the user can view visual information reconstructed as a virtual image on the virtual image reconstruction element DHOE at a wide viewing angle. The diffuser plate 120 is used in the hologram recording and is not used in the hologram reconstruction. The visual information formed at the diffuser plate 120 is recorded on the recording surface of the holographic film as an interference pattern of an object wave and a reference wave. As shown in (B) of FIG. 12, when the reference light is irradiated onto the virtual image reconstruction element DHOE in the hologram reconstruction, a particular type of visual information may be visible to the user due to +1st order diffracted light reflected from the interference pattern.

Referring to (B) of FIG. 12, when external light of the visible band is irradiated onto the holographic film of the virtual image reconstruction element DHOE disposed on the light entering element CHOE at the same angle as the reference light of the hologram recording, +1st order diffracted light is reflected from the holographic film due to the interference pattern of the recording surface. As a result, a virtual image reconstructing visual information with the +1st order diffracted light is visible to the user.

As described above, the embodiments of the disclosure dispose the directional light source device on the display panel and embed the image sensor in the display panel or dispose the image sensor below the display panel, thereby sensing the fingerprint at the screen of the display panel. Namely, the fingerprint can be sensed on the screen on which an image is displayed. Therefore, the user can be granted an access right of icons or an execution/playback file of applications or contents requiring fingerprint authentication on the screen after the fingerprint authentication by touching the screen of the display panel with his or her finger. The embodiments of the disclosure are advantageous in a reduction design of the bezel area, a waterproof design, a design freedom, etc. in the electroluminescent display because the fingerprint sensor does not need to be installed on the bezel area or the home button outside the screen.

Furthermore, the embodiments of the disclosure can reconstruct a particular type of visual information using the holographic film of the light entering element or the holographic film of the virtual image reconstruction element disposed on the light entering element applied to the directional light source device. The visual information can be reconstructed by the virtual image of the zeroth order diffracted light generated when light is irradiated at right angle onto the holographic film of the light entering element or the virtual image of the 1st order diffracted light generated when external light of the visible band is irradiated onto the virtual image reconstruction element.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A fingerprint sensor integrated display comprising:
   a display panel on which an input image is displayed;
   a fingerprint sensor disposed on the display panel, the fingerprint sensor configured to sense a fingerprint;
   a transparent substrate disposed on the display panel; and
   a light entering element configured to irradiate light from a light source onto the transparent substrate,
   wherein a pre-determined visual information different from the fingerprint is reconstructed as a holographic image through a holographic element at a location of the light entering element.

2. The fingerprint sensor integrated display of claim 1, wherein the holographic element has a recording surface,
   wherein an interference pattern is present in a portion of the recording surface, and the pre-determined visual information is recorded on another portion of the recording surface,
   wherein the holographic element is integrated with the light entering element.

3. The fingerprint sensor integrated display of claim 1, wherein the holographic element is a virtual image reconstruction element disposed on the light entering element,
   wherein the virtual image reconstruction element reconstructs the pre-determined visual information with the holographic image reconstructed by diffracted light reflected from a recording surface on which an interference pattern is formed.

4. The fingerprint sensor of claim 1, wherein the pre-determined visual information different from the fingerprint is reconstructed as the holographic image in response to incidence of external light on the light entering element.

5. The fingerprint sensor of claim 1, wherein the light entering element overlaps the light source.

6. A fingerprint sensor integrated display comprising:
   a display panel on which an input image is displayed;
   a transparent substrate disposed on the display panel;
   a light entering element configured to irradiate light from a light source onto the transparent substrate, and
   a light shielding layer pattern in contact with the light entering element,
   wherein a pre-determined visual information is patterned on the light shielding layer pattern.

7. The fingerprint sensor integrated display of claim 6, further comprising:
   an image sensor disposed below the display panel;
   a light exiting element disposed on a screen of the display panel and between the display panel and the transparent substrate and configured to refract a portion of light travelling within the transparent substrate so that the portion of the light travelling within the transparent substrate travels toward the display panel through a lower surface of the transparent substrate; and a low refractive index layer disposed between the light exiting element and the display panel and having a refractive index less than a refractive index of the light exiting element, wherein the light source is disposed below an edge of the transparent substrate, wherein the light entering element is disposed between the light source and the transparent substrate and refracts light from the light source at an angle at which light is able to be totally reflected within the transparent substrate.

8. A fingerprint sensor integrated display comprising:
a display panel on which an input image is displayed;
a transparent substrate disposed on the display panel;
a light entering element on the transparent substrate, the light entering element configured to irradiate light from a light source onto the transparent substrate; and
a virtual image reconstruction element disposed on the light entering element,
wherein the virtual image reconstruction element reconstructs a particular type of visual information with a virtual image reconstructed on a holographic element having an interference pattern.

9. The fingerprint sensor integrated display of claim 8, further comprising:
an image sensor disposed below the display panel;
a light exiting element disposed on a screen of the display panel and between the display panel and the transparent substrate and configured to refract a portion of light travelling within the transparent substrate so that the portion of the light travelling within the transparent substrate travels toward the display panel through a lower surface of the transparent substrate; and
a low refractive index layer disposed between the light exiting element and the display panel and having a refractive index less than a refractive index of the light exiting element,
wherein the light source is disposed below an edge of the transparent substrate,
wherein the light entering element is disposed between the light source and the transparent substrate and refracts light from the light source at an angle at which light is able to be totally reflected within the transparent substrate.

* * * * *